United States Patent
Eckberg

(10) Patent No.: US 6,492,433 B1
(45) Date of Patent: Dec. 10, 2002

(54) COST-EFFECTIVE PERFORMANCE ENHANCEMENT OF UV CURED EPOXYSILICONE RELEASE AGENTS

(75) Inventor: Richard P. Eckberg, Saratoga, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/920,608

(22) Filed: Aug. 1, 2001

(51) Int. Cl.⁷ .............. C08F 2/46; C08J 3/28
(52) U.S. Cl. ................... 522/31; 522/148
(58) Field of Search .................. 522/31, 148

(56) References Cited

U.S. PATENT DOCUMENTS

| | | |
|---|---|---|
| 4,279,717 A | 7/1981 | Eckberg et al. |
| 4,952,657 A | 8/1990 | Riding et al. |
| 5,010,118 A | 4/1991 | Desorcie et al. |
| 5,258,480 A | 11/1993 | Eckberg et al. |
| 5,340,898 A | 8/1994 | Cavezzan et al. |
| 5,360,833 A | 11/1994 | Eckberg et al. |
| 5,391,676 A | 2/1995 | Eckberg et al. |
| 5,411,996 A | 5/1995 | Eckberg et al. |
| 5,650,453 A | 7/1997 | Eckberg et al. |
| 5,721,290 A | 2/1998 | Eckberg et al. |
| 5,814,679 A | 9/1998 | Eckberg et al. |
| 6,232,362 B1 | 5/2001 | Agars et al. |

FOREIGN PATENT DOCUMENTS

WO    WO 99/09313    2/1999

OTHER PUBLICATIONS

Priou et al, RadTech 94 North America Conference Proceedings, pp 187–193 (Orlando, 1994).
Eckberg, RadTech Europe 97 Conference Proceedings, pp 198–207 (Lyon, 1997).
Eckberg, et al, RadTech Europe 99 Conference Proceedings, pp 507–514 (Berlin, 1999).
Eckberg et al, RadTech 2000 North America Conference Proceedings, pp 69–86 (Baltimore, 2000).

*Primary Examiner*—Nathan M. Nutter
(74) *Attorney, Agent, or Firm*—Kenneth S. Wheelock

(57) ABSTRACT

Blends of epoxy-functional silicone polymers with vinyl ether monomers and alkylphenol compounds plus an effective amount of a suitable iodonium photocatalyst provide a radiation-curable silicone release coating composition.

19 Claims, No Drawings

COST-EFFECTIVE PERFORMANCE ENHANCEMENT OF UV CURED EPOXYSILICONE RELEASE AGENTS

FIELD OF THE INVENTION

This invention relates to improved ultraviolet light curable silicone release coating compositions. More particularly, it relates to novel additive blends of alkylphenols and alkyl vinyl ethers, which, when added to epoxysilicone polymers, provide for superior miscibility of polar onium salt photocatalysts in the epoxysilicone medium, and provide for superior release of the resulting photocured silicone coating from acrylic adhesives laminated thereto.

BACKGROUND OF THE INVENTION

Silicone coating compositions are used for many applications including release coatings, or adhesive coatings, designed to permit release of aggressive adhesives without denigration of the adhesive properties due to contact with the silicone surface. Other silicone coatings well known to those versed in the art include protective coatings and conformal coatings. Such coatings have often been applied to various substrates as dispersions in solvents such as low boiling aromatic and aliphatic organic compounds or as emulsions dispersed in water. In such cases it is necessary to apply considerable heat to both remove the dispersing agent and to accelerate crosslinking (curing) of the silicone that has been applied to the substrate. Application of silicone without solvent or water dispersing agents is a desirable improvement of the art in that removal of volatile organic solvent requires environmentally compliant technology that adds cost to the coating process without otherwise benefiting the coating process. Similarly, elimination of a thermal cure step in favor of a low temperature radiation crosslinking process permits use of film, plastic or other thin gauge substrate material for the silicone release coating which would otherwise be ruled out because such substrates cannot accommodate the heat required for conventional silicone release coating crosslinking.

Silicone compositions have long been in use for rendering surfaces non-adherent to materials which would otherwise adhere thereto. Epoxy-functional polydimethylsiloxanes (PDMS), when combined with compatible iodonium cationic type photocatalysts, are well known to those skilled in the art to be useful UV curable silicone release coatings. Such combinations of organofunctional silicone polymers and lipophilic iodonium photocatalysts have been taught in U.S. Pat. No. 4,279,717 and many other subsequent patents. Such coatings based on cationic photocurable epoxysilicones have been shown to be readily coatable to thin, defect-free continuous films when applied to smooth paper or plastic film liners using 3 roll offset gravure or multiroll liquid film splitting techniques, and these coatings are quickly crosslinked by exposure to focused ultraviolet light to create low surface energy adhesive surfaces capable of release of organic pressure sensitive adhesives (PSA). A drawback to the cationic epoxysilicone based photocurable release coating systems has been their inability to provide long term stable release from commonly used aggressive acrylic PSA's, particularly if the adhesive is laminated to the silicone coating in-line, that is, as part of the converting process. While the precise cause of this performance deficiency is not established, it is thought that a significant post-cure of the epoxysilicone coating takes place which, when occurring in the laminate with the acrylic PSA, leads to chemical interactions of the silicone surface with the acrylic PSA which in turn leads to unstable release and even a lock-up of the silicone surface with the PSA. It is therefore clear that providing a means by which a photocured epoxysilicone release coating can consistently give low (premium) release of aggressive acrylic adhesives as a function of laminate aging is highly desirable.

The absence of solvent from a coating composition reduces the energy needed for crosslinking as well as the need for pollution abatement. But the absence of solvent leads to problems insofar as silicone release coatings are non-polar viscous materials that are immiscible with many polar additives including 'onium type cationic photocatalysts. Another problem associated with solvent-free silicone coatings is that the high viscosity associated with solvent free compositions is unsuited for many cost-effective coating techniques including direct gravure or indirect gravure coating. Such coating equipment is used for pattern coating of silicone to produce complex double release constructions and other specialty products. Vinyl ether monomers such as dodecylvinyl ether and the bis-vinyl ether of 1,4-cyclohexanedimethanol have been shown to be useful reactive diluents for photocurable epoxysilicone release coatings, capable of efficient reduction of viscosity and enhancement of photocure, as taught by Eckberg et al in U.S. Pat. No. 5,650,453. However, the presence of vinyl ethers in the cured epoxysilicone release coating gives rise to unstable release of the silicone coated liner from most acrylic and rubber based adhesives. Alkylphenols such as 4-dodecylphenol (DDP), in blends with certain alkanediols, have been shown to be effective reactive diluents for cationic photocure epoxysilicone release systems, as taught by Descorcie et al in U.S. Pat. No. 5,010,118. Also, the use of DDP or other alkylphenols in such cases for the enhanced miscibility of alkoxy-substituted bis-aryl iodonium and trisphenyl sulfonium hexafluoroantimonates has been published. Phenol-substituted epoxysilicone terpolymers have been described as controlled release additives for UV epoxysilicone systems in Riding et al, U.S. Pat. No. 4,952,657.

SUMMARY OF THE INVENTION

The present invention is based on the discovery that certain specific combinations of additives are miscible with photocurable silicone compositions and also act as compatibilizing agents for polar 'onium type cationic photocatalysts which are often incompletely miscible with nonpolar organofunctional silicones and which, unexpectedly, provide dramatic improvement in the stability of release of the resultant UV cured silicone coating from aggressive acrylic adhesives. The present invention provides for photocurable silicone release coating compositions that are efficiently photo-crosslinked, readily applied to film, paper, and glassine substrates, and which provide exceptionally stable release from aggressive adhesives. The compositions of the instant invention provide for a curable additive for catatonically photocurable silicone polymers, said additive selected from a first group consisting of vinyl ether monomers and a second group selected from a group of alkylphenol compounds.

The present invention therefore provides for an ultraviolet light or electron beam curable silicone coating composition comprising:

a) An epoxy functional silicone selected from the group consisting of:

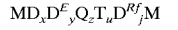

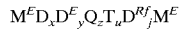

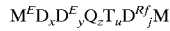

And mixtures thereof; and where:

$M=(CH_3)_3SiO_{1/2}$ $M^E=(C_6H_9O(CH_2)_2)(CH_3)_2SiO_{1/2}$ $D=(CH_3)_2SiO_{2/2}$ $D^E=(C_6H_9O)(CH_2)_2(CH_3)SiO_{2/2}$ $D^{Rf}=(CF_3CH_2CH_2)(CH_3)SiO_{2/2}$ $Q=SiO_{4/2}$ $T=(CH_3)SiO_{3/2}$ where j, x,y,z, and u are positive integers and j, z, and u may be zero and wherein said epoxy-functional silicone has a viscosity ranging from about 20 to about 100000 centistokes at 25° C. And, if preferred, a polydimethylsiloxane chainstopped with (poly)(carbinol) group-containing trialkylsiloxy species of the general formula:

$$M^{BOH}D_vM^{BOH}$$

Where D is as defined above, and $M^{BOH}=R^1R^2R^3SiO_{1/2}$, with $R^1$, $R^2$, and $R^3$ each monovalent radicals and each independently selected from the group consisting of hydrogen, trifluoropropyl, monovalent hydrocarbon radicals, and $(HO\text{-alkyl})_n$— radicals such that each $M^{BOH}$ chainstopper unit includes at least one, and preferable more than one, (HO-alkyl) group;

b) an unsaturated ether compound selected from the group consisting of:

$CH_2=CH-O-(CH_2)_{11}CH_3$ $(CH_2=CH-O-CH_2)_2-(C_6H_{10})$ $CH_2=CH-O-(CH_{a-b}R'_bCH_2-O-)_c-CH=CH_2$ $(CH_2=CH-O-CH_2)(HOCH_2)(C_6H_{10})$ $CH_2(CH_2COOCH_2-C_6H_{10}-CH_2OCH=CH_2)_2$ $(CH_2=CH-O-(CH_2)_4OOC)_2(C_6H_4)$ $CF_3(CF_2)_d-O-CH=CH_2$

Where a is two, b is zero or 1, c and d are integers, and R' is an alkyl group selected from $CH_3$, $C_2H_5$, $C_3H_7$, and $C_4H_9$;

c) an alkylphenol selected from the group described by:

$R_w-C_6H_i(OH)_k$, where R=saturated or unsaturated aliphatic substituent of from 1 to about 20 carbon atoms, halogenated aliphatic groups, alkylaryl groups, and where i=4−(w+k);

d) an effective amount of a bis(alkylphenyl)iodonium salt photocatalyst, said photocatalyst being selected from the salts of the groups of acids consisting of hexafluoroantimononic acid, hexafluorophosphoric acid, hexafluoroarsenic acid, tetrafluoroboric acid, triflic acid, tetra(perfluorophenyl)boric acid and mixtures thereof.

The subscripts on the various components of the epoxy-functional silicones may be varied within the constraints listed such that viscosity and other properties are within a desired range. The present invention further provides for curable silicone compositions that include unsaturated ethers selected from the group listed in b) above, plus alkylphenols selected from the group listed in c) above and further defined as $4\text{-}C_{12}H_{25}-(C_6H_4)-OH$ and $4\text{-}C_9H_{19}-(C_6H_4)-OH$, and $2\text{-}C_3H_5-(C_6H_4)-OH$. The present invention comprises ingredients a), b), c), and d). Those knowledgeable and skilled in the art will recognize that other epoxy-functional silicones bearing various other organofunctional groups such as polyethers, hydroxyesters, and the like, may be substituted for the epoxysilicone ingredients a) listed above.

DETAILED DESCRIPTION OF THE INVENTION

UV curable siloxane fluids provided by the instant invention are more specifically dialkylepoxysiloxy- or trialkylsiloxy chain-stopped polydialkyl-alkylepoxysiloxane copolymers diluted with a reactive vinyl ether monomer plus an alkylphenol. The reactive vinyl ether monomer is independently polymerizable and crosslinkable by virtue of the presence of vinyl ether groups in the monomer, while the alkylphenol will cure into the crosslinked epoxysilicone network. Thus, curing of this combination system as provided by the present invention results in interpenetrating polymerized networks that may or may not be crosslinked to each other.

The epoxy functionality is obtained when certain of the hydrogen atoms on the polysiloxane chain of a polydialkyl-alkylhydrogen siloxane copolymer are reacted with unsaturated epoxide molecules via hydrosilation addition as taught in U.S. Pat. No. 5,258,480.

The radiant energy curable epoxyfunctional silicone fluid can comprise an epoxy-functional dialkyl-alkylsiloxy- or trialkylsiloxy-chainstopped polydialkyl alkylepoxy siloxane copolymer fluid that is the product of sequential hydrosilation reactions involving a polydialkylsiloxane that includes unsaturated groups with a separate polydialkyl-alkylhydrogen siloxane, followed by reaction of an unsaturated epoxy monomer wherein the resulting epoxy-silicone fluid product is subsequently diluted with a vinyl ether plus alkylphenol.

The alkyl groups of the pre-crosslinked polydialkyl-alkylepoxy siloxane are preferably methyl groups. The unsaturated polydialkylsiloxane is preferably a vinyl-dimethylsiloxy chain stopped linear PDMS. The unsaturated epoxy monomer used to make the epoxy functional silicone is preferably an olefinic cyclo-aliphatic epoxy compound such as 4-vinylcyclohexenemonoxide (VCHO), vinylnorbornenemonoxide, limoneneoxide, or dicyclopentadiene monoxide.

Hydrosilation reactions are used for pre-crosslinking and subsequent functionalization of silylhydride containing PDMS. These reactions are catalyzed by low levels of Group VIII noble metal complex compounds. Such complexes are silicone-miscible compounds of ruthenium, rhodium, palladium, platinum, osmium, and iridium. Certain rhodium and platinum complex compounds are particularly preferred, as taught by Eckberg et al in U.S. Pat. No. 5,391,676.

The vinyl functional silicone employed in the pre-crosslinking network synthesis may be selected from the group consisting of dimethylvinylsiloxy-chainstopped polydimethylsiloxane, dimethylvinyl-chainstopped dimethyl-methylvinyl siloxane, tetravinyl tetramethylcyclotetrasiloxane, and sym-tetramethyldivinyldisiloxane.

The hydrogen functional siloxane precursor fluid can be selected from the group consisting of dimethylhydrogensiloxy-stopped polydimethylsiloxane, dimethylhydrogen siloxy-stopped polydimethyl-methylhydrogen siloxane, trimethylsiloxy-stopped polydimethyl-methylhydrogen siloxane, tetramethylcyclotetrasiloxane, and sym-tetramethyldisiloxane.

Certain vinyl ether monomers and oligomers are widely available, and, as cationically polymerizable monomers and oligomers, have been found to be useful additives and diluents in compatible photocurable epoxy-based compositions. Such compositions have been found to be curable by means of electron beam radiation as well as by ultraviolet light. The reactive additives consist in part of vinyl ether monomers and oligomers, with those most preferred for the practice of the instant invention being:

$CH_2=CHO-(CH_2)_{11}CH_3$,
$(CH_2=CHO-CH_2)_2-(C_6H_{10})$,
$(CH_2=CHOCH_2)(HOCH_2)(C_6H_{10})$,
$CH_2(CH_2COOCH_2-C_6H_{10}-CH_2OCH=CH_2)_2$,
$(CH_2=CHO(CH_2)_4OOC)_2(C_6H_4)$,
$CH_2=CHO(CH_{a-b}R'_bCH_2O)_c-CH=CH_2$,
$CF_3(CF_2)_d-OCH=CH_2$,
where a is 2, b is 0 or 1, c and d are integers, and R' is an alkyl group selected from $CH_3$, $C_2H_5$, $C_3H_7$, and $C_4H_9$, and also consist in part of alkylphenol compounds including but not limited to:

4-$(C_{12}H_{25}-(C_6H_4)-OH$,
4-$(C_9H_{19}-(C_6H_4)-OH$,
2-$(CH_2=CHCH_2)-(C_6H_4)-OH$.

The chemical formulas of the compounds in the foregoing lists are written without regard for positional isomerism of substituents. Since the polymerizing and crosslinking of these molecules depends only on the reactive vinyl ether and phenol groups of the vinyl ether monomers and oligomers and alkylphenols, respectively, the relative positional isomerism of these reactive substituents should not affect the chemical properties for which these compounds are used in the instant invention. Therefore these compounds are claimed as the general structures with the expectation that geometric isomers having the same empirical and molecular formula will function similarly to effect the purposes of the invention.

We have discovered that when the vinyl ether+alkylphenol diluted epoxy functional silicone polymers (also referred to as epoxysilicones) are combined with a compatible bis-aryl iodonium catalyst, the resulting mixture can be exposed to ultraviolet light or electron beam radiation to initiate a crosslinking reaction which in turn forms a solid adhesive silicone release coating incorporating the photopolymerized vinyl ether and alkylphenol possessing a very stable release from common aggressive pressure sensitive adhesives (PSA's) to which the photocured silicone coating is laminated.

UV light curable or electron beam (EB) curable epoxysilicone compositions of the instant invention may be applied to cellulosic or plastic film substrates including but not limited to supercalenderedkraft (SCK) paper, glassine paper, polyethylene kraft (PK) paper, polyethylene film, polypropylene film, polyester film, and polyvinylchloride (PVC) films. The actinic radiation—initiated crosslinking reaction cures the liquid coating to form a solid, crosslinked non-adherent (or adhesive) surface also known as a release coating on the substrate so coated.

It has been shown that UV and/or EB curable epoxysilicone polymers such as those taught by Eckberg et al in U.S. Pat. No. 4,279,717 and in subsequent patents, are efficiently cured in the presence of certain compatible 'onium type cationic photocatalysts without inhibition by atmospheric oxygen, which is a useful feature of this technology, since practice of such coating processes does not require complex "inerting" of cure chambers. Such epoxysilicone compositions are constrained within a narrow range of viscosity and epoxy content dictated by the need for application of defect-free coatings about 0.5 to 2.0 microns thick capable of application on substrates of choice at high speed, and by the necessity that these photocurable epoxysilicone coatings quickly photo-crosslink upon exposure to actinic radiation, all the while retaining good adhesion to the substrate.

Three roll offset gravure or multi-roll film splitting coating techniques are commonly practiced for high speed coating of silicone compositions and are most suited for application of silicones whose viscosity is in the range of 100 to 3000 cstk viscosity at the temperature of application. Rapid cure requires sufficient amount of reactive oxirane be present in the epoxysilicone to ensure high reactivity of the coating, as well as aid in dissolution of the polar 'onium salt catalyst in the coating. But, if too much oxirane is present in the epoxysilicone, the cured coating will not properly release PSA's.

The epoxy-functional silicones comprising the coating composition of the instant invention are selected from the group consisting of:

$$MD_xD^E_yQ_zT_uD^{Rf}_jM,$$

$$M^ED_xD^E_yQ_zT_uD^{Rf}_jM^E,$$

$$M^ED_xD^E_yQ_zT_uD^{Rf}_jM,$$

and mixtures thereof, where:
$M=(CH_3)_3SiO_{1/2}$,
$M^E=(C_6H_9O)(CH_2CH_2)(CH_3)_2SiO_{1/2}$
$D=(CH_3)SiO_{2/2}$
$D^E=(C_6H_9O)(CH_2CH_2)(CH_3)SiO_{2/2}$
$D^{Rf}=(CF_3CH_2CH_2)(CH_3)SiO_{2/2}$
$Q=SiO_{4/2}$
$T=CH_3SiO_{3/2}$ where j, u, x, y, and z are positive integers and j, z, and u may be zero and where said epoxy-functional silicone has a viscosity of between 20 and 100000 cstk at ambient conditions. The subscripts on the various components of the epoxysilicones may be varied at will within the constraints already listed such that the polymer viscosity is within the defined, coatable range. It should be noted that the viscosity of these undiluted epoxysilicones can exceed that which may be readily applied to substrates using conventional application equipment. If a diluent is used to improve the coating characteristics of the epoxysilicone composition it is important that the selected diluent or blend of diluents be capable of reducing the viscosity of the coating composition while maintaining the crosslink density and photoresponse of the curable coating mixture. An additional consideration regarding choice of diluent is that the curing catalyst (an 'onium salt for such cationically polymerizable compounds) must remain miscible with the coating bath. It is known that certain vinyl ethers and vinyl ether oligomers both reduce viscosity and accelerate the photocure of epoxy-based coating compositions. In addition, the inclusion of a second reactive diluent may further advantageously speed crosslinking and improve catalyst compatibility. Thus, the specific combination of vinyl ether and alkylphenol diluents of the instant invention provide for a novel silicone-based coating system that permits use of high viscosity epoxysilicone or of epoxysilicones that would otherwise be immiscible with polar 'onium photocatalysts but for the addition of the vinyl ether and the alkylphenol. Since the coating composition is a solvent-free composition as defined in the art, the fraction of vinyl ether monomers and oligomers and alkylphenols present in the coating mixture can range from about 1 to 90 percent, more preferably from about 2 to 50 percent, and most preferably from about 5 to 25 percent.

Based on a coating composition of 100 parts containing about 5 to 20 parts total reactive diluent mixture and 95 to 80 parts epoxy-functional silicone, 0.2 to 3 parts of cationic-type 'onium salt photocure catalyst are added, more preferably 0.2 to 2 parts and most preferably 0.2 to 1.5 part.

The requirement for rapid efficient photocure militates that photocatalysts and, if desired, photosensitizers, be freely miscible with the photocurable compositions in which they are mixed, forming either clear solutions or stable suspensions or dispersions. In the case of epoxy-functional photocurable silicones of the instant invention, 'onium-type cationic salt photocatalysts should be compatible with the epoxysilicone fluid. Iodonium salts of the general formula $(R\text{-}Ph)_2I^+X^-$ have been designed to address the miscibility issue posed by use of ionic polar substances in nonpolar silicone polymers, where R is typically a mixture of alkyl fragments derived from linear alkylate grade dodecylbenzene; such R is generically termed 'dodecyl' although the alkyl groups vary in chain length. As a consequence, the $(R\text{-}Ph)_2I^+$ salts are mixtures rather than pure compounds and therefore exhibit freezing point depression relative to a pure bis-alkylphenyl iodonium salt and are amorphous, non-crystalline semi-fluids that are more compatible with non-polar media especially epoxysilicones. Where $X=SbF_6^-$ or $B(C_6F_5)_4^-$, the iodonium species are most compatible with epoxysilicone polymers and are most efficient at promoting rapid photocrosslinking reaction; where $X=PF_6^-$, $Cl^-$ or $BF_4^-$ or other similarly small anions whose charge is localized, analogous iodonium salts are poorly compatible with epoxysilicone polymers useful for silicone release coatings. It should be noted that the iodonium salts where the anion is hexafluoroantimonate or tetrakis (perfluorophenyl)borate, while very effective for photocure of epoxysilicone release coatings, are much more expensive than iodonium salts whose anion is hexafluorophosphate or tetrafluoroborate. It is therefore evident that if inexpensive iodonium salts can be made useful for photocure of epoxy-silicone coatings in which they are normally immiscible, it would be advantageous for processing of photocurable release coatings.

The UV curable epoxy-functional silicone based compositions of the instant invention can be applied to cellulosic and other substrates including paper, metal, foil, plastic, films, PK paper, SCK paper, and other common liner materials. A UV light or electron beam initiated reaction will cure the epoxysilicone compositions of the present invention to form a non-adherent, adhesive surface on the coated substrate.

DESCRIPTION OF THE PREFERRED EMBODIMENTS

Ultraviolet light curable silicone release coating compositions of the instant invention are obtained by combining an iodonium salt effective for catalysis of a UV light initiated reaction of a cationically polymerizable material with a dialkylepoxysiloxy- or trialkylsiloxy-stopped epoxysilicone fluid having a viscosity of about 20 to 100000 cstk at 25° C. with a vinyl ether monomer plus an alkylphenol compound.

The preferred UV light initiator or photocatalyst utilized by the present invention is a diaryl iodonium salt derived from 'linear alkylate' dodecylbenzene. Such salts have the following general formula:

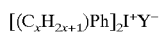

where x is an integer varying from about 6 to about 18, $Y=SbF_6$, $AsF_6$, $PF_6$, $BF_4$, or $B(C_6F_5)_4^-$, and Ph stands for a phenyl group. 'Linear alkylate' dodecylbenzene is a commercial grade of alkylbenzenes prepared by Friedel Craft alkylation of benzene with a mixed alpha-olefin distillation cut. Consequently, the alkylate contains both straight and branched chain alkyl benzenes of a wide range of molecular weight and isomer mix. Such a mixture is useful, however, to promote compatibility of the iodonium salt derived therefrom with nonpolar epoxysilicones.

The UV curable silicone coating compositions of the present invention utilize epoxy-functional silicone fluids that can be prepared via different routes. Olefin epoxide compounds that include unsaturation and oxirane functionality react with silyl-hydride functional polysiloxanes via hydrosilation to produce organofunctional siloxanes bearing pendant epoxy groups. 4-vinylcyclohexeneoxide (VCHO) is especially useful for synthesis of UV curable epoxysilicones in this fashion. The analogous hydrosilation reaction between vinyl siloxane groups and silylhydride groups is a well-known means of crosslinking silicone coatings and elastomers. This latter reaction is used to partially crosslink silylhydride functional silicones and vinyl-functional silicones creating a lightly crosslinked loose network, which, provided an excess of silylhydride is present at the onset of the reaction, creates a siloxane network with residual SiH groups that can undergo subsequent addition to unsaturated epoxy monomers such as VCHO to produce epoxysilicones which are partially networked prior to final photocure.

Such epoxysilicones can be prepared from other unsaturated oxiranes including allylglycidyl ether, vinylnorbornene oxide, and dicyclopentadiene monoxide. While cyclohexyl epoxy functional silicones are particularly useful, other olefin epoxies may be used to create epoxysilicones without altering the properties of the cured silicone release coating. The scope of this invention is not limited to the epoxy silicone species used in the examples to follow.

The photocurable epoxysilicone based coating compositions comprising the instant invention are illustrated by numerous example which follow. The instant invention is not limited by the particular examples described. Those skilled in the art will be able to provide other epoxy functional silicones, vinyl ether monomers or oligomers, and other alkylphenol diluents upon consideration of the examples. All US patents referenced in this application are hereby and herewith incorporated by reference.

EXAMPLES

Example I

In example I of the practice of the instant invention, the following materials were used in coating formulations:

UV9400: a commercial linear epoxy-functional polydimethylsiloxane polymer, 250 cstk viscosity, with Epoxy Equivalent Weight=1500.

Catalyst A: a 42% solution of bis(4-dodecylphenyl) iodonium hexafluorophosphate in diacetone alcohol.

Catalyst B: A commercial product including ~50% bis(4-dodecylphenyl)iodonium hexafluoroantimonate+isopropylthioxanthone sensitizer in an alkylglycidyl ether reactive diluent.

DDP: 4-dodecylphenol (Eastman Chemicals)
DDVE: n-dodecylvinyl ether (ISP, Inc)
EHDO: 2-ethyl-1,3-hexanediol (Aldrich Chemical Co.)

To study the effect of DDP and DDVE diluent blends on the miscibility of iodonium catalysts A and B in the UV9400 epoxysilicone polymer, the following blends were prepared:

| Mix UV9400 | Parts | EHDO | DDP | DDVE | CatA | CatB | Observation |
|---|---|---|---|---|---|---|---|
| 1 | 100 | 0 | 0 | 0 | 4 | 0 | Opaque mixture, catalyst quickly precipitated |
| 2 | 90 | 10 | 0 | 0 | 4 | 0 | Very hazy mixture |
| 3 | 90 | 0 | 10 | 0 | 4 | 0 | Very hazy mixture |
| 4 | 90 | 0 | 0 | 10 | 4 | 0 | Very hazy mixture |
| 5 | 80 | 0 | 10 | 10 | 4 | 0 | Clear, homogeneous solution |
| 6 | 84 | 0 | 8 | 8 | 4 | 0 | slightly hazy mixture |
| 7 | 100 | 0 | 0 | 0 | 0 | 2 | Hazy mix, catalyst settled out of suspension in 24 hours |
| 8 | 95 | 0 | 0 | 5 | 0 | 2 | Hazy mixture, catalyst settled out of suspension in 24 hours |
| 9 | 95 | 0 | 5 | 0 | 0 | 2 | Slightly hazy mixture, stable on standing |
| 10 | 90 | 0 | 5 | 5 | 0 | 2 | Clear, homogeneous solution |

Formulation of a one-phase blend of UV9400 epoxysilicone with the iodonium $PF_6$ catalyst solution A requires about 20% of a 1/1 mix of DDP/DDVE be present; similarly clear and stable mixtures of UV9400 epoxysilicone with the iodonium antimonate catalyst solution B requires about 10% of the same DDP/DDVE mix. The above mixtures were tested for qualitative UV cure response in this fashion: thin coatings of each mix were manually applied to a PK substrate with a doctor blade. The coated samples were passed through an RPC model QC1202 Lab UV Processor equipped with two Hanovia medium pressure mercury vapor arc-fired UV lamp sources capable of independent operation at 100, 200, or 300 watt/in nominal power. The combination of minimum lamp power and maximum conveyer speed at which each coating was crosslinked to a smear- and migration-free (migration to 3M Scotch™ 610 cellophane tape) was determined. UV flux the conditions cited was then measured using an EIT 'Powerpuck' meter. Our qualitative photocure results are tabulated below.

| Coating | Conveyer | Lamp Power | UV flux | Observation |
|---|---|---|---|---|
| 1 | 100 fpm | 600 watt/in | 460 mJ/cm² | No cure |
| 2 | 100 | 600 | 460 | No cure |
| 3 | 200 | 400 | 140 | Cured, no migration, hard smear |
| 4 | 100 | 600 | 460 | Poor cure; severe migration |
| 5 | 400 | 400 | 75 | Cured; no migration, hard smear |
| 6 | 400 | 400 | 75 | Cured; slight migration noted |
| 7 | 400 | 400 | 75 | Cured; no migration, no smear |
| 8 | 400 | 300 | 58 | Cured; no migration, hard smear |
| 9 | 400 | 400 | 75 | Cured; no migration, no smear |
| 10 | 400 | 200 | 30 | Cured; no migration, hard ruboff |

The best photocure response and best miscibility of catalyst (A and B) was achieved with an additive mixture of DDP+DDVE. It should be noted that catalyst A (the inexpensive hexafluorophosphate salt) is completely incompatible with UV9400 epoxysilicone and that the coating 1 did not photocure. Iodonium hexafluoroantimonates are both more miscible with, and more photoefficient for cure of epoxysilicones than analogous hexafluorophosphates, but the use of the DDP+DDVE diluent mixture makes the iodonium $PF_6$ catalyst a practical alternative for UV cure of epoxysilicone polymers.

Example II

Test formulations were prepared for trials on an 18-inch width pilot coating line at Black Clawson Machine Co. A coating equivalent to mix 5 above was prepared as a clear, homogeneous solution, and a separate mix 11 was prepared as mix 5 but with 2 phr of catalyst A instead of 4 phr. A control mix 1 was also prepared. Each coating formula was applied to a Thilmany 44 lb/ream PK liner using a 5 roll film splitting coater to lay down 1.1 gsm of each catalyzed silicone compound. The coated liner was exposed to one or two banks of Fusion Systems™ H lamp 600 watt/in UV sources at a line speed of 600 feet/minute. The control mix 1 did not cure, even at reduced line speed, but the coatings of mixes 5 and 11 were observed to crosslink to smear- and migration-free release surfaces immediately offline. Several strips of TESA™ 7475 acrylic adhesive test tape were affixed to a sample of each cured silicone-coated liner within 2 minutes of exposure to UV light. Release force needed to peel off the liner from the tape was subsequently recorded as a function of room temperature and 70° C. oven aging using a TLMI peel tester set for 300 ipm peel at 180° angle. The results are tabulated below.

| | | Release, g/in, laminate aged | | | |
|---|---|---|---|---|---|
| Coating | No. of Lamps | 40 hour 70 C. | 4 day RT | 10 day RT | 42 Mix day RT |
| 5 | 2 | 140 | 101 | 96 | 78 |
| 5 | 1 | 154 | 107 | 97 | 82 |
| 11 | 2 | 109 | 84 | 77 | 70 |
| 11 | 1 | 128 | 80 | 81 | 84 |

TESA 7475 is an aggressive test tape that will age up rapidly on oven aging of laminates to partially or poorly UV-cured epoxysilicone release coatings. Release of a control coating without the DDP/DDVE additive mixture could not be determined since there was no cure of control coating 1 in this case. It is apparent that low levels of bis(dodecylphenyl)

iodonium hexafluorophosphate (~1.7% $PF_6$ salt solids in Coating 5 and half that concentration in coating 11) are effective for fast photocure of an epoxysilicone coating with useful, stable release performance provided that DDP+DDVE additive mixture is present in the UV9400 polymer.

Example III

An experiment to demonstrate the utility of DDP+DDVE additives in UV curable epoxysilicone release systems where the more active bis(dodecylphenyl)iodonium hexafluoroantimonate catalyst is used was then carried out. The following coating baths were prepared for trials on the Black Clawson pilot coater as described in Example 3 above.

| Coating Mix | Formula | Coating Appearance |
|---|---|---|
| 7 (control) | 100/2 UV9400/Catalyst B | Hazy, stable mix |
| 12 | 100/0.5 UV9400/Catalyst B | Hazy, stable mix |
| 13 | 90/5/5/0.5 UV9400/DDP/DDVE/ | Catalyst B Clear solution |

Pilot coater trials were carried out as described above using a Thilmany 44 lb/ream PPK (polypropylene coated craft) substrate at a line speed of 800 fpm. One and two banks of lamps were employed to effect cure, and TESA 7475 acrylic test tape was laminated to samples of cured silicone coated liner within a couple of minutes of UV lamp exposure. Release was recorded as above, after 24hours' room temperature and 70 C. oven aging.

Our results were surprising, as noted below.

| Coating Mix | No. of Lamps | RT 24 hr release | 70 C. 24 hr release | Ratio of 70 C./RT release |
|---|---|---|---|---|
| 7 | 2 | 20 g/in | 47 g/in | 2.35 |
| 7 | 1 | 19.5 | 57 | 2.92 |
| 12 | 2 | 59.0 | 380 | 6.44 |
| 12 | 1 | 80.0 | ~900 | 11.3 |
| 13 | 2 | 31.6 | 44 | 1.39 |
| 13 | 1 | 30.3 | 47 | 1.55 |

The release ratio of 70 C./RT aged release provides a quantitative means of comparing relative stability of the release of the very aggressive TESA 7475 acrylic test tape from the different UV cured silicone coatings. A release ratio of 1.0 indicates exceptional stability of release, which is highly desirable. Some age-up of release of liner from the aggressive TESA 7475 test tape is normal, but results >2.0 indicate incomplete cure of the epoxysilicone, as unreacted oxirane in the silicone can interact with the acrylic adhesive, particularly at elevated temperature. Oven aging of laminates is regarded as an indicator of long term shelf stability of laminated label stock, and is widely practiced in the industry as a routine quality test. The results demonstrate that the DDP+DDVE additive package provides remarkable stability of release even when only 0.5% of the antimonate catalyst package B is present (~0.25 wt % of active iodonium salt). Release of the control coating 12 quickly climbed to near lock-up (bonding of the silicone to the adhesive).

It was established that additives consisting of dodecyl vinyl ether plus dodecylphenol dramatically improve long term acrylic PSA laminated release performance of photocured epoxysilicone release coatings. An extended series of trials on the Black Clawson pilot coating line were then conducted to better understand the relationship of catalyst concentration and DDP+DDVE additive concentration in terms of affecting release behavior. A $3^2$ experimental design was set up where catalyst B concentration and additive (as a 1/1 mix of DDP/DDVE) concentration were varied as follows:

| Coating | Parts UV9400 Polymer | Parts DDP/DDVE Additive | Parts Catalyst B |
|---|---|---|---|
| 14 | 100 | 0 | 0.5 |
| 15 | 100 | 0 | 1.0 |
| 16 | 100 | 0 | 2.0 |
| 17 | 95 | 5 | 0.5 |
| 18 | 95 | 5 | 1.0 |
| 19 | 95 | 5 | 2.0 |
| 20 | 90 | 10 | 0.5 |
| 21 | 90 | 10 | 1.0 |
| 22 | 90 | 10 | 2.0 |

Each coating was applied to PK liner at a line speed of 200 meter/min (650 fpm), with silicone applied at a target coat weight of 1.1 gsm. All coatings were exposed to one bank of Fusion H lamps operating at 400 watt/in power. UV flux irradiating the coatings was therefore about 80% of the total UV irradation during the single lamp runs described above. Bath E was a centerpoint, so 5 replicates of this coating were run along with single runs of the others. TESA 7475 acrylic test tapes were affixed to each cured silicone coated liner as soon as possible after UV exposure, the laminates then aged at 70 C. and ambient conditions. The force required to peel the liner from the test tape at 300 ipm speed and 180° angle was recorded as the laminated samples were aged. Release results so obtained are tabulated below:

| Coating | 1 day 70 C. | 2 day RT | Ratio (1 day 70/ 2 day RT) | 15 day RT | 30 day RT |
|---|---|---|---|---|---|
| 14 | 900 g/in | 35.4 g/in | 25.4 | 453 g/in | 1100 g/in |
| 15 | 499 | 27.3 | 18.2 | 165 | 510 |
| 16 | 101 | 25.4 | 3.97 | 61.4 | 194 |
| 17 | 81.9 | 24.0 | 3.41 | 48.3 | 121 |
| 18* | 58.6 | 24.6 | 2.63 | 39.8 | 70.9 |
| 19 | 48.0 | 26.7 | 1.79 | 41.6 | 83.2 |
| 20 | 60.6 | 25.8 | 2.35 | 38.8 | 54.2 |
| 21 | 39.0 | 24.5 | 1.59 | 35.3 | 44.1 |
| 22 | 44.3 | 34.2 | 1.29 | 41.2 | 47.0 |

*"18" results are averages of 5 replicates

At all catalyst concentrations employed in this sequence, the presence of the additive promoted superior release stability, particularly as a function of oven aging of the laminate samples. Statistical analysis of the results yielded this relationship:

Release Ratio=31.1−5.6(additive phr)−14.8(catalyst phr)+0.26(additive phr)$^2$+1.36(additive phr)(catalyst phr); $R^2$ value 95%.

It is clear that iodonium catalyst concentration is an important factor governing long term release performance of these photocured epoxysilicone coatings versus the acrylic test tape TESA 7475, but the big improvement in performance accompanying the presence of the DDP+DDVE additive package is reflected in the equation as well.

A different set of experiments related to the above Black Clawson trials was then carried out to confirm and better define the efficacy of the DDP+DDVE additive package for the enhancement of photocure response and consequent superior release performance established by the pilot coater results. Coating formulations were prepared for lab coating out of solvent, as follows:

| Solvent Bath (in solvent) | UV9400 | DDP | DDVE | Catalyst B | CH$_2$Cl$_2$ solvent |
|---|---|---|---|---|---|
| A | 10.0 g | 0 | 0 | 0.05 g | 40.0 g |
| B | 9.5 g | 0 | 0.5 g | 0.05 g | 40.0 g |
| C | 9.5 g | 0.5 g | 0 | 0.05 g | 40.0 g |
| D | 9.0 g | 0.5 g | 0.5 g | 0.05 g | 40.0 g |

On a solids basis, each coating includes 0.5% of catalyst solution B, or ~0.25 wt % of active iodonium antimonate salt. Each solution was coated on a PK substrate using a #3 Meyer Rod to provide a coatweight of 1.5 gsm. The volatile methylene chloride solvent evaporated as each coating was exposed to 80 mJ/cm$^2$ focused UV light in the RPC UV Lab processor previously described. Each coating cured to a smear- and migration-free surface as defined above. TESA 7475 acrylic test tape was affixed to each coated substrate immediately after cure, laminates were then oven-aged at 70 C. and at room temperature, and the force required to peel the liner from the tape at 300 ipm peel speed was recorded, with these results:

| Coating | 5 day oven aged | 5 day RT aged | 11 day RT aged | 30 day RT aged |
|---|---|---|---|---|
| A | >1200 g/in | 21.5 g/in | 41.5 g/in | 88 g/in |
| B | 183 | 15.6 | 19.3 | 24 |
| C | 37.6 | 22.4 | 21.0 | 25 |
| D | 21.7 | 18.1 | 17.1 | 20 |

The results are unambiguous and indicate that the combination of DDP with DDVE provides the best release performance enhancement in this lab coating experiment, consistent with the solvent-free coating trials on the pilot line described above. DDP alone does provide some benefit in the form of improved oven aged release stability, but the blend of the two compounds is superior. The DDP+DDVE combination permits use of reduced iodonium antimonate concentration for epoxysilicone release coating applications, and this has obvious commercial implications, because the iodonium catalyst is an expensive component of the coating formulation. The DDP+DDVE combination also provides for improved release performance regardless of iodonium salt concentration.

Example IV

The examples described above have illustrated that a combination of DDP and DDVE present in a photocurable epoxysilicone composition improves iodonium catalyst miscibility, speeds cure response, and provides for remarkable enhancement of release performance of cured silicone coatings prepared therefrom. The examples thus far cited were for curable coatings where bis(dodecylphenyl) iodonium hexafluorophosphate and bis(dodecylphenyl) iodonium hexafluoroantimonate functioned as the cationic photo-catalyst. This example determines whether the unique benefits of the alkylphenol+vinyl ether additives may also be obtained if a different class of iodonium catalyst is substituted for the ones described above. U.S. Pat. No. 5,340,898 teaches the use of bis(aryl)iodonium tetrakis (perfluorophenyl)borate catalysts in photocurable epoxysilicone coating compositions that are chemical analogs of those taught in U.S. Pat. No. 4,279,717 and subsequent patents. The following coating baths for lab coating experiments were prepared:

| Coating | BathEpoxysilicone | Additive | Catalyst | Solvent |
|---|---|---|---|---|
| E | 10.0 g UV9400 | none | 0.10 gram Catalyst B | 40 g CH$_2$Cl$_2$ |
| F | 9.0 g UV9400 | 1.0 g | 0.10 gram Catalyst B | " |
| G | 10.0 g PC600 | none | 0.10 gram Catalyst C | " |
| H | 9.0 g PC600 | 1.0 g | 0.10 gram Catalyst C | " |

'Additive' = 1/1 mix of DDP/DDVE
UV9400 is a commercial epoxysilicone (GE Silicones) described above
PC600 is a commercial epoxysilicone polymer, Epoxy Equiv. Wt. 1200, 300 cstk viscosity (Rhodia Silicones)
Catalyst C = 20% ((cumyl)(tolyl)iodonium) tetrakis(perfluorophenyl)borate solution in diacetone alcohol Each of the above coating baths was applied to Thilmany 44 lb/ream PK liner substrate using a mechanical lab coater equipped with a #3 Meyer Rod to deposit ~1.4 gsm silicone coatweight following evaporation of the solvent. Each coating was cured by exposure to 600 watts/in total UV lamp power in the RPC Lab UV Processor described above. A conveyer speed of 400 fpm permitted ~100 mJ/cm$^2$ focused UV flux. All coatings were qualitatively cured to smear- and migration-free adhesive surfaces upon UV irradiation. Several strips of TESA 7475 acrylic test tape were affixed to each coated sample immediately upon exiting the Processor, and the tapes were then aged at 70 C. and 25 C. (room temperature) for 24 hours. The force required to peel the liner from the acrylic tapes was recorded using the TLMI tester as described above at a 300 ipm peel, with these results:

| Coating | 70 C. 1 day Release | 25 C. 1 day Release | Release ratio, 70 C./25 C. |
|---|---|---|---|
| E | 89.4 g/in | 24.4 g/in | 3.66 |
| F | 24.1 | 25.6 | 0.94 |
| G | 176 | 26.2 | 6.72 |
| H | 45.6 | 28.1 | 1.62 |

As in the previous examples, the presence of the DDP+ DDVE additive package promotes stable release regardless of the nature of the iodonium catalyst employed. It should be noted that the iodonium tetrakis(perfluorophenyl)borates are very soluble in epoxysilicone media without solubilizing diluents, thus the performance enhancement observed when the additives are present is in fact a function of superior cure engendered by these substances rather than merely a function of superior compatibility.

Example V

Lab coating experiments were carried out to demonstrate that the performance enhancement provided by the DDP+ DDVE additive mix was also obtained with different epoxysilicone polymers, in particular, those reactive polymers designed for tight release and easy release applications. The following coating baths were prepared in methylene chloride solvent:

| Coating | BathUV9400 | UV9430 | UV9440E | Additive | Catalyst B | CH$_2$Cl$_2$ |
|---|---|---|---|---|---|---|
| I | 2.5 g | 7.5 g | 0 | 0.05 g | 40.0 g | |
| J | 1.5 g | 7.5 | 1.0 g | " | " | |
| K | 9.0 | 1.0 g | 0 | " | " | |
| L | 8.0 | 1.0 | 1.0 | " | " | |
| M | 2.3 | 7.5 | 0.2 | 0 | " | " |
| N | 1.37 | 7.5 | 0.13 | 1.0 | " | " |

UV9430 is a commercial tight release epoxysilicone composition, as taught in U.S. Pat. No. 5,360,833
UV9440E is a commercial easy release (smooth release) additive polymer, as taught in U.S. Pat. No. 5,814,679
'Additive' is a 1/1 mix of DDP/DDVE Each coating bath was applied to Thilmany PK liner substrate using the mechanical lab coater as described previously. Coatweight of 1.4 gsm was put down on the PK liner, followed by cure effected by exposure to ~90 mJ/cm$^2$ focused UV light in the RPC Lab UV Processor. The TESA 7475 acrylic test tape was laminated to the cured silicone release coating immediately post-cure as in previous examples. Oven- and ambient aged laminates were tested for release force as previously described, at 300 ipm peel.

| Coating | 1 day 70 C. Release | 1 day RT Release | Release Ratio | 2 wk RT Release |
|---|---|---|---|---|
| I | >2000 g/in | 392 g/in | >5.0 | 940 g/in (zippy) |
| J | 512 | 340 | 1.67 | 446 |
| K | 673 | 27.8 | 25.0 | 90.6 |
| L | 27.8 | 22.3 | 1.25 | 28.3 |
| M | 1090 | 259 | 4.21 | 679 |
| N | 316 | 258 | 1.23 | 340 |

It is apparent that the DDP+DDVE additive package improves release performance of UV cured epoxysilicone coatings which include both tight release and easy release polymers. The remarkable positive change in release ratio observed from coating K to coating L, and from coating M to N, is unexpected and suggests that premium release formulations with the UV9440E bis(carbinol) stopped linear polydimethylsiloxane component are viable coatings if the additive package is present, featuring stable long term and oven aged release from acrylic adhesives.

Example VI

It was of interest to establish if the improvement in release stability provided by alkylphenol-vinyl ether additive blends was observed versus an SBR (rubber) based adhesive in the same fashion as observed versus the aggressive acrylic test tape. A similar experiment to that described in Example V was run in the lab, again coating 20% solids epoxysilicone formulations in methylene chloride solvent on PK liner using Meyer rod to achieve ~1.4 gsm silicone release coating build. Cure was effected by exposure to 100 mJ/cm$^2$ UV irradiation flux. The following formulae were coated (solvent is omitted):

| Coating | UV9400 | DDP | DDVE | Catalyst B |
|---|---|---|---|---|
| O | 10 parts | 0 | 0 | 0.075 parts |
| P | 9.75 | 0 | 0.25 | " |
| Q | 9.75 | 0.25 | 0 | " |

-continued

| Coating | UV9400 | DDP | DDVE | Catalyst B |
|---|---|---|---|---|
| R | 9.50 | 0.25 | 0.25 | " |
| S | 9.30 | 0.35 | 0.35 | " |
| T | 9.0 | 0.5 | 0.5 | " |

TESA 4651 SBR test tapes were affixed to each cured coating on the PK liner immediately after cure, then aged at 70 C. and RT as before. Force required to peel the liner from the aggressive rubber PSA at 300 ipm peel speed was recorded as a function of laminate aging, with these results:

| Coating | 1 Day 70 C. Release | 1 Day RT Release | 1 Wk RT Release | 4 Wk RT Release |
|---|---|---|---|---|
| O | 142 g/in | 19.0 g/in | 86.5 g/in | 180 g/in |
| P | 232 | 17.3 | 18.8 | 24 |
| Q | 47.4 | 18.8 | 16.1 | 23.3 |
| R | 15.8 | 14.6 | 12.1 | 14.1 |
| S | 17.9 | 14.0 | 12.6 | 13.3 |
| T | 18.0 | 15.0 | 11.0 | 11.8 |

The synergy of DDVE with DDP for promoting more complete cure, and therefore more stable aged release, is apparent when an SBR type adhesive is laminated to the release coating. While the effect is not as pronounced as when acrylic PSA's are laminated, the results show that the novel additive blends have value in applications other than acrylic PSA laminations. The coated samples obtained from the Black Clawson pilot run described in Example III above were laminated with TESA 4651 SBR test tapes along with TESA 7475 test tapes, and release of the liners from the former tapes at 300 ipm peel speed was recorded as a function of ambient temperature laminate aging, with these results:

| Coating (from B-C trials) | 6 day Release | 72 day Release |
|---|---|---|
| 14 | 45.9 g/in | 97.7 g/in |
| 15 | 42.2 | 89.8 |
| 16 | 36.4 | 49.9 |
| 17 | 37.7 | 14.0 |
| 18 | 40.5 | 16.7 |
| 19 | 40.5 | 15.7 |
| 20 | 51.1 | 18.3 |
| 21 | 44.0 | 17.1 |
| 22 | 38.2 | 18.4 |

Surprisingly, coatings that included the additive blend exhibited a significant drop in release from the TESA 4651

SBR tape over extended shelf aging. Those coatings without the additive blend exhibited some increase in release the same conditions.

Example VII

Lab experiments were carried out to confirm that the additive package effect observed for blends of DDP and DDVE is a general phenomenon not limited to any particular alkylphenol+vinyl ether combination. Accordingly, 20% solutions of the following coating formulations were prepared in methylene chloride, then coated on PK liner substrate and on polyester (Dupont 2 mil Type A PET) liner as described in the examples above:

| Coating | UV9400 | DDP | NP | DDVE | CHVE | EHVE | Catalyst B |
|---------|--------|-----|-----|------|------|------|-----------|
| U | 10.0 parts | | | | | | 0.05 parts |
| V | 9.0 | 0.5 | 0.5 | | | | " |
| W | 9.0 | | 0.5 | 0.5 | | | " |
| X | 9.0 | 0.5 | | | 0.5 | | " |
| Y | 9.0 | 0.5 | | | | 0.5 | " |
| Z | 9.0 | | 0.5 | 0.5 | | | " |
| AA | 9.0 | | 0.5 | | | 0.5 | " |

Where
NP = 4-nonylphenol
CHVE = divinyl ether of 1,4-cyclohexanedimethanol
EHVE = 2-ethylhexyl vinyl ether UV cure of these coatings was effected by exposure to 90 mJ/cm$^2$ UV flux in the RPC UV Processor as described above. TESA 7475 acrylic test tapes were laminated to each cured coating on the PK and PET liner immediately after UV irradiation, and the usual 300 ipm peel release recorded as a function of oven- and ambient-laminate aging.

Results are tabulated below.

| Coating | Liner | 1 day 70 C. Release | 1 day RT Release | Release Ratio | 25 day RT Release |
|---------|-------|---------------------|------------------|---------------|-------------------|
| U | PET | 206 g/in | 29.9 g/in | 6.67 | 160 g/in |
| U | PK | 636 | 67.8 | 9.09 | 720 |
| V | PET | 18.9 | 17.0 | 1.11 | 22.0 |
| V | PK | 51.7 | 41.0 | 1.27 | 38.2 |
| W | PET | 20.1 | 17.2 | 1.16 | 21.7 |
| W | PK | 49.8 | 45.5 | 1.10 | 44.7 |
| X | PET | 40.0 | 32.2 | 1.24 | 42.0 |
| X | PK | 91.1 | 78.0 | 1.17 | 95.0 |
| Y | PET | 15.2 | 13.8 | 1.10 | 17.6 |
| Y | PK | 42.2 | 34.3 | 1.23 | 37.0 |
| Z | PET | 44.1 | 36.3 | 1.21 | 49.0 |
| Z | PK | 102 | 82.0 | 1.24 | 115 |
| AA | PET | 18.0 | 14.3 | 1.26 | 18.0 |
| AA | PK | 40.6 | 31.5 | 1.29 | 37.7 |

This data set is complex, but demonstrates that the use of vinyl ethers+alkylphenols to improve photocure response and release stability of epoxysilicone release coatings is not limited to DDP and DDVE. Nonylphenol functions interchangeably with DDP, and the monovinyl ether EHVE and divinyl ether CHVE appear to work as well as DDVE. CHVE acts to increase release, as taught in U.S. Pat. No. 5,650,453 and apparent in these results (coatings X and Z). Consistently easier release of the silicone coating from the test tape was observed when the silicone was applied to PET rather than PK liner.

Example VIII

The converting industry makes release liners by coating and curing silicone release agents on a variety of different substrates. UV curable epoxysilicones are among those silicones useful for this purpose. The ultimate use of a silicone coated liner is to act as a vehicle for a label or other device which includes an adhesive layer permitting it to be affixed to packaging, windows, bottles, foods, and etc. The silicone coated release liner must therefore be laminated to the adhesive, generally in a separate process wherein adhesive (applied as a hot melt, or from solvent or water diluent) is coated onto the cured silicone layer and the label or facestock applied to the adhesive layer to create the complete laminate product, also called label stock. It is advantageous to carry out silicone coating and curing coupled with adhesive coating and lamination all in one operation, often referred to as tandem, in-line, or one-pass lamination, rather than as two separate coating processes. In order for in-line lamination to succeed, the silicone release coating must be sufficiently well cured that it not interact with the adhesive applied to it either during the coating or adhesive curing operation. Should the silicone be incompletely crosslinked, rapid increase of the force needed to peel the silicone release liner from the adhesive occurs after lamination, particularly if the laminate is stored or tested at elevated temperatures. Until now, cationic UV cure epoxysilicone release liners have not been used for tandem lamination processing of conventional label stock, as almost all preferred adhesives applied thereon show unstable, climbing release and eventual lock-up. Cationic UV epoxysilicone release coatings have been shown to require a significant period of post-cure before they may be successfully laminated to PSA's, particularly so in the case of aggressive acrylic adhesives favored for many label applications, ruling out tandem coating processing.

Experiments were carried out to determine the efficacy of the alkylphenol+vinyl ether additive package for enabling tandem UV cure of an epoxysilicone release coating coupled with sequential coating, curing, and lamination of an aggressive emulsion acrylic PSA. The following UV curable epoxysilicone formulations were prepared:

23: 95 parts of a commercial epoxysilicone polymer blend, UV9500 (GE Silicones, as taught in U.S. Pat. No. 5,397,813)+5 parts of UV9440E polymer (described above)+3 parts of catalyst B (described above)

24: 90 parts of UV9500+5 parts of a 1/1 mix of DDP/DDVE+5 parts of UV9440E 3 parts of catalyst B 25: 80 parts of UV9500+5 parts of a 1/1 mix of DDP/DDVE+15 parts of UV9440E+3 parts of catalyst B Each coating was applied to Otis UV350™ SCK liner using an offset gravure coater to provide for ~2.0 gsm silicone build, then cured by exposure to a single Fusion Systems 600 watt/inch power H lamp UV source at a line speed of 600 fpm. Tandem coating of an emulsion acrylic adhesive then followed, in-line, at the 600 fpm line speed specified. A 0.5 mil thick coating of the PSA was cured by heating at 250° F. for 2 minutes to drive off water and crosslink the adhesive, then a facestock laminated to the adhesive layer completing the tandem process and creating the finished label construction. It should be noted that less than 3 seconds elapsed after UV cure of the silicone coating before application of the emulsion acrylic PSA.

The finished label stock was cut into one inch tapes which were aged at 70° C. in an oven, the force required to peel the silicone coated liner from the adhesive/face stock lamina at a 300 ipm rate and 180°<of peel recorded as a function of oven aging. Results are noted below:

| Silicone Coating | 24 hr @ 70 C. | 48 hr @ 70 C. | 72 hr @ 70 C. | 96 hr @ 70 C. |
|---|---|---|---|---|
| 23 (control) | >100 g/in | lockup (no - - release) | | |
| 24 | 19 g/in | 22 g/in | 23 g/in | 23 g/in |
| 25 | 15 g/in | 18 g/in | 16 g/in | 17 g/in |

It is apparent that the presence of the additive package permits tandem coating and curing of a UV cure epoxysilicone based release coating with an aggressive emulsion acrylic PSA which is not feasible absent the DDP+DDVE blend. The stability of release of the emulsion acrylic adhesive from the coatings # 23 and # 24 on extended oven aging of the tandem-processed label stock is remarkable, and conclusively demonstrates the utility of alkylphenol+vinyl ether blends as UV cure additives promoting superior performance.

Having described the invention, that which is claimed is:

1. An ultraviolet light or electron beam curable silicone coating composition comprising:
   (a) an epoxy functional silicone selected from the group consisting of:

$MD_x D^E_y Q_z T_u D^{Rf}_j M$, $M^E D_x D^E_y Q_z T_u D^{Rf}_j M^E$, $M^E D_x D^E_y Q_z T_u D^{Rf}_j M$,

And mixtures thereof; and where:
   $M=(CH_3)_3 SiO_{1/2}$,
   $M^E=(C_6H_9O(CH_2CH_2)(CH_3)_2 SiO_{1/2}$
   $D=(CH_3)SiO_{2/2}$
   $D^E=(C_6H_9O)(CH_2CH_2(CH_3)SiO_{2/2}$
   $D^{Rf}=(CF_3CH_2CH_2)(CH_3)SiO_{2/2}$
   $Q=SiO_{4/2}$
   $T=CH_3 SiO_{3/2}$
   where j, u, x, y, and z are positive integers and j, z, and u may be zero and where said epoxy-functional silicone has a viscosity between 20 and 100000 cstk at ambient conditions;
   (b) an unsaturated ether compound selected from the group consisting of:
   $CH_2=CHO—(CH_2)_{11}CH_3$,
   $(CH_2=CHO—CH_2)_2—(C_6H_{10})$,
   $(CH_2=CHOCH_2)(HOCH_2)(C_6H_{10})$,
   $CH_2(CH_2COOCH_2—C_6H_{10}—CH_2OCH=CH_2)_2$,
   $(CH_2=CHO(CH_2)_4OOC)_2(C_6H_4)$,
   $CH_2=CHO(CH_{a-b}R'_b CH_2O)_c—CH=CH_2$,
   $CF_3(CF_2)_d—OCH=CH_2$,
   where a is 2, b is 0 or 1, c and d are integers, and R' is an alkyl group selected from $CH_3$, $C_2H_5$, $C_3H_7$, and $C_4H_9$;
   (c) an alkylphenol having the formula:
   $R_w—C_6H_i(OH)_k$, where R is selected from the group consisting of saturated or unsaturated aliphatic group of 1 to 20 carbon atoms, halogenated aliphatic groups of 1 to 20 carbon atoms, and alkylaryl groups of 1 to 20 carbon atoms, where i=4−(w+k);
   (d) an effective amount of a bis(alkylphenyl)iodonium salt photocatalyst, said photocatalyst being selected from the salts of the groups of acids consisting of hexafluoro-antimononic acid, hexafluorophosphoric acid, hexafluoroarsenic acid, tetrafluoroboric acid, triflic acid, tetra(perfluorophenyl)boric acid and mixtures thereof.

2. The composition of claim 1 where component (b) ranges from about 1 to about 39 percent by weight of the composition comprising components (a), (b), and (c) and component (c) ranges from about 1 to about 39 percent by weight of the composition comprising components (a), (b), and (c).

3. The composition of claim 1 wherein component (b) ranges from about 2 to about 20 percent of the composition comprising components (a), (b), and (c) and component (c) ranges from about 2 to about 20 percent of the composition comprising components (a), (b), and (c).

4. The composition of claim 1 wherein component (b) ranges from about 5 to about 10 percent of the composition comprising components (a), (b), and (c) and component (c) ranges from about 5 to about 10 percent of the composition comprising components (a), (b), and (c).

5. The composition of claim 1 wherein the epoxy-functional silicone is $MD_x D^E_y Q_z T_u D^{Rf}_j M$.

6. The composition of claim 5 wherein component (b) ranges from about 1 to about 39 percent by weight of the composition comprising components (a), (b), and (c) and component (c) ranges from about 1 to about 39 percent by weight of the composition comprising components (a), (b), and (c).

7. The composition of claim 5 wherein component (b) ranges from about 2 to about 20 percent of the composition comprising components (a), (b), and (c) and component (c) ranges from about 2 to about 20 percent of the composition comprising components (a), (b), and (c).

8. The composition of claim 5 wherein component (b) ranges from about 5 to about 10 percent of the composition comprising components (a), (b), and (c) and component (c) ranges from about 5 to about 10 percent of the composition comprising components (a), (b), and (c).

9. The composition of claim 1 wherein the epoxy-functional silicone is $M^E D_x D^E_y Q_z T_u D^{Rf}_j M^E$.

10. The composition of claim 9 wherein component (b) ranges from about 1 to about 39 percent by weight of the composition comprising components (a), (b), and (c) and component (c) ranges from about 1 to about 39 percent by weight of the composition comprising components (a), (b), and (c).

11. The composition of claim 9 wherein component (b) ranges from about 2 to about 20 percent of the composition comprising components (a), (b), and (c) and component (c) ranges from about 2 to about 20 percent of the composition comprising components (a), (b), and (c).

12. The composition of claim 9 wherein component (b) ranges from about 5 to about 10 percent of the composition comprising components (a), (b), and (c) and component (c) ranges from about 5 to about 10 percent of the composition comprising components (a), (b), and (c).

13. The composition of claim 1 wherein the epoxy-functional silicone is $M^E D_x D^E_y Q_z T_u D^{Rf}_j M$.

14. The composition of claim 13 wherein component (b) ranges from about 1 to about 39 percent by weight of the composition comprising components (a), (b), and (c) and component (c) ranges from about 1 to about 39 percent by weight of the composition comprising components (a), (b), and (c).

15. The composition of claim 13 wherein component (b) ranges from about 2 to about 20 percent of the composition comprising components (a), (b), and (c) and component (c) ranges from about 2 to about 20 percent of the composition comprising components (a), (b), and (c).

16. The composition of claim 13 wherein component (b) ranges from about 5 to about 10 percent of the composition comprising components (a), (b), and (c) and component (c) ranges from about 5 to about 10 percent of the composition comprising components (a), (b), and (c).

17. An ultraviolet light or electron beam curable silicone coating composition comprising:
(a) an epoxy functional silicone selected from the group consisting of $MD^E_x D^E_y Q_z T_u D^{Rf}_j M$, $M^E D^E_x D^E_y Q_z T_u D^{Rf}_j M^E$, $M^E D^E_x D^E_y Q_z T_u D^{Rf}_j M$, and mixtures thereof, where:
$M=(CH_3)_3 SiO_{1/2}$,
$M^E=(C_6H_9O)(CH_2CH_2)(CH_3)_2 SiO_{1/2}$
$D=(CH_3)SiO_{2/2}$
$D^E=(C_6H_9O)(CH_2CH_2)(CH_3)SiO_{2/2}$
$D^{Rf}=(CF_3CH_2CH_2)(CH_3)SiO_{2/2}$
$Q=SiO_{4/2}$
$T=CH_3SiO_{3/2}$
where j, u, x, y, and z are positive integers and j, z, and u may be zero and where said epoxy-functional silicone has a viscosity between 100 and 10000 cstk at ambient conditions,;
(b) an unsaturated ether compound selected from the group consisting of:
$CH_2=CHO—(CH_2)_{11}CH_3$,
$(CH_2=CHO—CH_2)_2—(C_6H_{10})$,
$(CH_2=CHOCH_2)(HOCH_2)(C_6H_{10})$,
$CH_2(CH_2COOCH_2—C_6H_{10}—CH_2OCH=CH_2)_2$,
$(CH_2=CHO(CH_2)_4OOC)_2(C_6H_4)$,
$CH_2=CHO(CH_{a-b}R'_b CH_2O)_c—CH=CH_2$,
$CF_3(CF_2)_d—OCH=CH_2$,
where a is 2, b is 0 or 1, c and d are integers, and R' is an alkyl group selected from $CH_3$, $C_2H_5$, $C_3H_7$, and $C_4H_9$;
(c) an alkylphenol selected from the group described by $R_w—C_6H_i(OH)_k$, where R=saturated or unsaturated aliphatic groups of 1 to 20 carbon atoms, halogenated aliphatic groups, alkylaryl groups, and where i=4−(w+k);
(d) an effective amount of a bis(alkylphenyl)iodonium salt photocatalyst, said photocatalyst being selected from the salts of the groups of acids consisting of hexafluoro-antimononic acid, hexafluorophosphophoric acid, hexafluoroarsenic acid, tetrafluoroboric acid, triflic acid, tetra(perfluorophenyl)boric acid and mixtures thereof.

18. An ultraviolet light curable silicone coating composition comprising:
(a) an epoxy functional silicone selected from the group consisting of $MD^E_x D^E_y Q_z T_u D^{Rf}_j M$, $M^E D^E_x D^E_y Q_z T_u D^{Rf}_j M^E$, $M^E D^E_x D^E_y Q_z T_u D^{Rf}_j M$, and mixtures thereof, where:
$M=(CH_3)_3 SiO_{1/2}$,
$M^E=(C_6H_9O)(CH_2CH_2)(CH_3)_2 SiO_{1/2}$
$D=(CH_3)SiO_{2/2}$
$D^E=(C_6H_9O)(CH_2CH_2)(CH_3)SiO_{2/2}$
$D^{Rf}=(CF_3CH_2CH_2)(CH_3)SiO_{2/2}$
$Q=SiO_{4/2}$
$T=CH_3SiO_{3/2}$
with j, u, x, y, and z positive integers and j, z, and u are be zero or positive and where said epoxy-functional silicone has a viscosity between 100 and 10000 cstk at ambient conditions;
(b) an unsaturated ether compound selected from the group consisting of:
$CH_2=CHO—(CH_2)_{11}CH_3$,
$(CH_2=CHO—CH_2)_2—(C_6H_{10})$,
$(CH_2=CHOCH_2)(HOCH_2)(C_6H_{10})$,
$CH_2(CH_2COOCH_2—C_6H_{10}—CH_2OCH=CH_2)_2$,
$(CH_2=CHO(CH_2)_4OOC)_2(C_6H_4)$,
$CH_2=CHO(CH_{a-b}R'_b CH_2O)_c—CH=CH_2$,
$CF_3(CF_2)_d—OCH=CH_2$,
where a is 2, b is 0 or 1, c and d are positive integers, and R' is an alkyl group selected from $CH_3$, $C_2H_5$, $C_3H_7$, and $C_4H_9$;
(c) an alkylphenol having the formula:
$R_w—C_6H_i(OH)_k$, where R is selected from the group consisting of saturated or unsaturated aliphatic group of 1 to 20 carbon atoms, halogenated aliphatic groups of 1 to 20 carbon atoms, and alkylaryl groups of 1 to 20 carbon atoms, where i=4−(w+k);
(d) an effective amount of a bis(alkylphenyl)iodonium salt photocatalyst, said photocatalyst being selected from the salts of the groups of acids consisting of hexafluoro-antimononic acid, hexafluorophosphophoric acid, hexafluoroarsenic acid, tetrafluoroboric acid, triflic acid, tetra(perfluorophenyl)boric acid and mixtures thereof.

19. An ultraviolet light or electron beam curable silicone coating composition comprising:
(a) an epoxy functional silicone selected from the group consisting of:

$MD^E_x D^E_y Q_z T_u D^{Rf}_j M$, $M^E D^E_x D^E_y Q_z T_u D^{Rf}_j M^E$, $M^E D^E_x D^E_y Q_z T_u D^{Rf}_j M$, and mixtures thereof, where:
$M=(CH_3)_3 SiO_{1/2}$,
$M^E=(C_6H_9O)(CH_2CH_2)(CH_3)_2 SiO_{1/2}$
$D=(CH_3)SiO_{2/2}$
$D^E=(C_6H_9O)(CH_2CH_2)(CH_3)SiO_{2/2}$
$D^{Rf}=(CF_3CH_2CH_2)(CH_3)SiO_{2/2}$
$Q=SiO_{4/2}$
$T=CH_3SiO_{3/2}$
where j, u, x, y, and z are positive integers and j, z, and u may be zero or positive and where said epoxy-functional silicone has a viscosity between 150 and 1000 cstk at ambient conditions;
(b) an unsaturated ether compound selected from the group consisting of:
$CH_2=CHO—(CH_2)_{11}CH_3$,
$(CH_2=CHO—CH_2)_2—(C_6H_{10})$,
$(CH_2=CHOCH_2)(HOCH_2)(C_6H_{10})$,
$CH_2(CH_2COOCH_2—C_6H_{10}—CH_2OCH=CH_2)_2$,
$(CH_2=CHO(CH_2)_4OOC)_2(C_6H_4)$,
$CH_2=CHO(CH_{a-b}R'_b CH_2O)_c—CH=CH_2$,
$CF_3(CF_2)_d—OCH=CH_2$,
where a is 2, b is 0 or 1, c and d are integers, and R' is an alkyl group selected from $CH_3$, $C_2H_5$, $C_3H_7$, and $C_4H_9$;
(c) an alkylphenol having the formula:
$R_w—C_6H_i(OH)_k$, where R is selected from the group consisting of saturated or unsaturated aliphatic group of 1 to 20 carbon atoms, halogenated aliphatic groups of 1 to 20 carbon atoms, and alkylaryl groups of 1 to 20 carbon atoms, where i=4−(w+k);

(d) an effective amount of a bis(alkylphenyl)iodonium salt photocatalyst, said photocatalyst being selected from the salts of the groups of acids consisting of hexafluoro-antimononic acid, hexafluorophosphoric acid, hexafluoroarsenic acid, tetrafluoroboric acid, triflic acid, tetra (perfluorophenyl)boric acid and mixtures thereof.

* * * * *